Patented Oct. 12, 1943

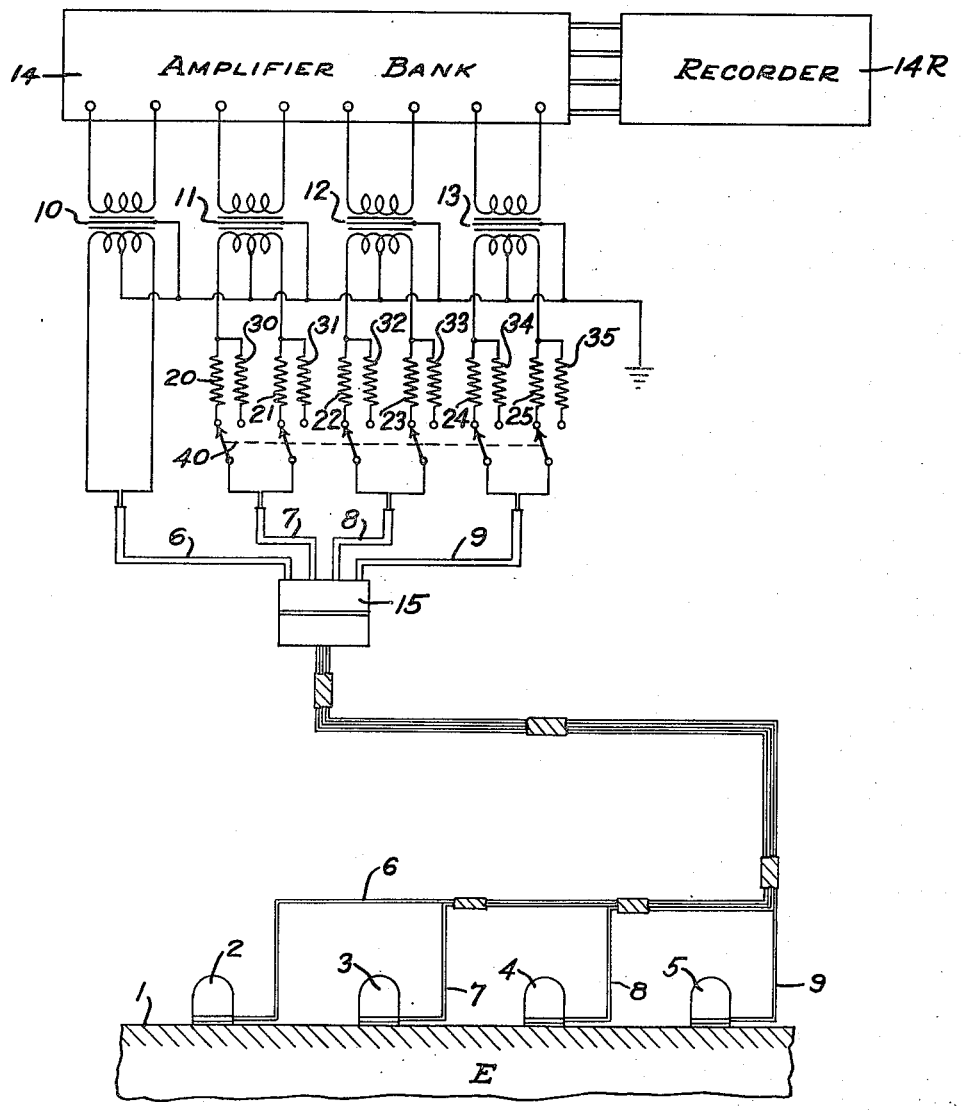

2,331,363

UNITED STATES PATENT OFFICE 2,331,363

SEISMIC PROSPECTING SYSTEM

Harold W. Washburn, Pasadena, Calif., assignor to Consolidated Engineering Corporation, Pasadena, Calif., a corporation of California Application July 26, 1939, Serial No. 286,652

5 Claims. (Cl. 177—352)

My invention pertains to a method and apparatus to be used for detecting seismic waves or other vibrations at various spaced points. My invention provides for recording waves at a central reproducing station without variations in phase or amplitude distortion due to differences in lengths of the transmission lines used to convey signals from spaced receiving points to said central reproducing station.

Objects of my invention are: to prevent timing errors due to differences in receptor line lengths; to provide adjustable means for compensating for various sets of receptor lines; to provide means for balancing the two sides of each of a plurality of transmission lines to ground; and to provide a method and means for electrically equalizing a plurality of seismic wave receptor lines of different lengths.

My invention possesses numerous other objects and features of advantage, some of which, together with the foregoing, will be set forth in the following description of specific apparatus embodying and utilizing my novel method. It is therefore to be understood that my method is applicable to other apparatus and I do not limit myself in any way to the apparatus of the present application, as I may adopt various other apparatus embodiments, utilizing the method, within the scope of the appended claims.

Referring to the drawing, I represents the surface of the earth E on which are placed receptors 2, 3, 4, and 5, adapted to receive seismic waves generated at a distant point such as by detonation of an explosive and to convert said received seismic waves into corresponding electrical waves. Said electrical waves are transmitted over separate cables 6, 7, 8, and 9 to input transformers 10, 11, 12, and 13 of the bank 14 of amplifiers, mixing circuits, and recorders 14R.

In order to facilitate laying out receptors at standard uniformly spaced positions along a line of exploration, I prefer to tape cables 6, 7, 8, and 9 together. To provide for interchangeability of such standard distances I use a main plug or connector box 15 for connecting any set of receptor cables to the input transformers 10, 11, 12, and 13.

The cables which I use vary in length according to the distances of the receptors from the point at which the recordings are made. I have found that such differences in transmission line length introduce different overall transmission characteristics from various receptors to the respective input transformers. I have also found that such differences in overall transmission characteristics introduce changes in character of the recorded waves from one channel to another and that such differences in character may introduce errors in the relative arrival times of waves received at the various receptor positions.

I have found that such errors may be eliminated by using correction impedances, such as resistors, in series with cables of different physical lengths. For this purpose the longest cable needs no correction impedances and the correction impedances used with the respective cables compensate for the differences in length.

Referring to the drawing, I ground the centers of primaries of transformer 10, 11, 12, and 13 to balance the separate pairs of conductors of each channel to ground and to prevent crossfeed between channels, as disclosed in copending United States patent application for Geophysical prospecting receptor circuits, Serial No. 164,100, filed September 16, 1937, by Herbert Hoover, Jr. To equalize the cables I connect the longest cable 6 directly across the input terminals of transformer 10, and I connect the two leads of each of the other cables to the respective transformers through corresponding correcting resistors. For example, the two conductors of cable 7 are connected to transformer 11 primary through equal resistors 20 and 21, each of which equals the difference in resistance of single conductors of cables 6 and 7. By use of such resistors as shown in connection with each cable the overall transmission characteristic is the same from each receptor to the corresponding input transformer and the two sides of each cable are balanced to ground 16 through the corresponding transformer primary. Resistors are especially useful as correcting impedances for seismometer lines, because the lines usually differ by only a resistance factor at the low frequencies usually significant in seismic prospecting. However, when high frequency seismic waves are to be recorded, more complex correction impedances are required.

As mentioned hereinabove I make provision for compensating for line differences due to various spacing of the receptors. Thus, resistors 20, 21, 22, 23, 24, and 25 correspond to a certain set of receptor spacings while resistors 30, 31, 32, 33, 34, and 35 correspond to a different set of receptor spacings. Inasmuch as I prefer to be able to switch from one set of spacings to another I utilize a common control represented by dotted line 40 for switching from one set of resistors to another. It is to be understood of course that equalizing impedances may also be used in connection with the longest cable if desired.

I prefer to include an equalizing impedance in each conductor of each pair of lines connecting a receptor with the amplifier bank as this enables me to balance each transmission line to ground by means of a fixed ground connection at the electrical centers of the respective transformer primaries. By including interchangeable compensating impedances in series with each transformer lead, fixed ground balancing connections may be utilized even when sets of cable are changed.

My invention makes possible the use of low impedance receptors and seismic wave amplifier input transformers having low impedances when viewed from the primaries. Such low impedance elements reduce any high-line pickup that might otherwise be present. Were it not for my invention, differences in receptor line impedances would introduce series phase differences between lines so terminated with low impedances. In addition my invention makes possible using lighter weight cables than could be used otherwise by virtue of the fact that I am able to use relatively high impedance cables having wire of small cross-section.

Thus, it is seen that in general, by means of my invention, I am able to avoid errors in recording differences in seismic wave arrival times which would otherwise occur due to differences in lengths of receptor lines.

I claim:

1. In apparatus for detecting and recording the relative arrival times of related seismic waves received at points differently spaced at the earth's surface from a central location, a receptor at each of the spaced points adapted to convert received seismic waves into corresponding electrical waves, a common bank of electric wave amplifiers at the central location, a transformer on the input of each amplifier, a cable electrically connecting each receptor to one of the amplifier transformers, each cable being of a length corresponding to the distance of the corresponding receptor from the amplifier bank, separate lumped impedances connected in series with the respective cables and transformers, said impedances being of values adapted to equalize the electrical wave transmission characteristics of the cables whereby related seismic waves received at the spaced receptors may be transmitted to the respective amplifiers without change in time-phase relationship.

2. In apparatus for detecting and recording the relative arrival times of related seismic waves received at points differently spaced at the earth's surface from a central location, a receptor at each of the spaced points adapted to convert these seismic waves into corresponding electrical waves, a common bank of electrical wave amplifiers and recorders, a cable electrically connecting each receptor to one of the amplifiers, each cable being of a length corresponding to the distance of the corresponding receptor to the amplifier bank, and means associated with each cable and of a value corresponding to the corresponding cable length for equalizing the electrical wave transmission characteristics of the cables in such a manner as to facilitate recording seismic waves in the same time-phase relationship possessed by the waves when received at the respective receptors.

3. In apparatus for detecting and recording the relative arrival times of related seismic waves received at points differently spaced at the earth's surface from a central location, a receptor at each of these spaced points adapted to convert received seismic waves into corresponding electrical waves, the spacing of the receptors being variable, a common bank of electric wave amplifiers at the central location, a cable electrically connecting each receptor to one of the amplifiers, each cable being of a length corresponding to and indicative of the distance of each receptor from the central location for a given spacing of said points, an adjustable impedance in series with each of the cables adapted to equalize the electrical wave transmission characteristic of the cables in such a manner as to facilitate recording seismic waves in the same time-phase relationship possessed by the waves when received at the respective receptors.

4. In apparatus for measuring the relative times required for waves simultaneously generated at a single source to travel to spaced points, wave detectors located at said points adapted to convert received waves into corresponding electrical waves, a group of corresponding electrical wave reproducing elements located in fixed relationship to each other and said points, transmission lines of different lengths connecting the detectors to the respective reproducing elements, said lengths corresponding to the respective distances of the corresponding detectors to the corresponding reproducing elements, equalizing impedances of different values connected in lines of different lengths and so proportioned with respect to the lengths of the respective lines as to assure that waves are applied to the reproducing elements in the same time-phase relationship that they bear at the spaced points, and common time measuring means connected to said reproducing elements for indicating the relative times of arrival of waves at said points.

5. In signalling apparatus, a single source of energy acting to propagate waves in an extended medium, a plurality of detectors positioned at spaced points in said medium and adapted to convert received waves into corresponding electrical waves, a plurality of time coordinating wave reproducing elements and in fixed relationship to each other and said points located at a common wave reproducing center, electrical wave transmission lines of different lengths connecting different detectors to different reproducing elements, said lengths corresponding to the respective distances of the corresponding detectors to the corresponding reproducing elements, and equalizing impedances of different values connected in lines of different lengths and of values corresponding to the lengths of the individual lines for controlling the time-phase relationship of reproduced waves.

HAROLD W. WASHBURN.